Figure 1:
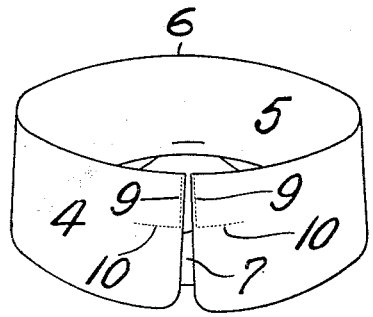

R. M. RODDEN.
COLLAR.
APPLICATION FILED DEC. 22, 1911.

1,107,359.

Patented Aug. 18, 1914.

WITNESSES
Stuart R. Wallen
G. M. Moreland

INVENTOR
Richard M. Rodden
By
His Attorney.

UNITED STATES PATENT OFFICE.

RICHARD MONTGOMERY RODDEN, OF MONTREAL, QUEBEC, CANADA.

COLLAR.

1,107,359.　　　　Specification of Letters Patent.　　Patented Aug. 18, 1914.

Application filed December 22, 1911. Serial No. 667,263.

*To all whom it may concern:*

Be it known that I, RICHARD MONTGOMERY RODDEN, of the city of Montreal, in the Province of Quebec and Dominion of Canada, have invented certain new and useful Improvements in Collars, of which the following is a full, clear, and exact description.

This invention relates to improvements in collars, and the main object is to provide a collar which will have the appearance of an ordinary standing collar combined with the convenience of the folded collar. The ordinary standing collar such as is used for evening wear is preferred by many persons on account of its appearance, but this form has been supplanted to a large extent by the fold collar on account of its superior fit, and also on account of the ease with which the tie is held in position. The present invention aims to combine the two forms in order to produce a collar having the most desirable features of each.

In the drawings which illustrate my invention:—

Figure 2:
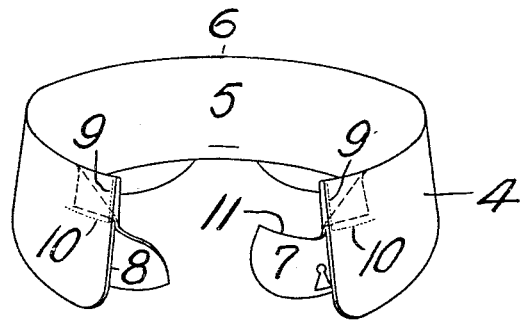

Figure 1 is a perspective view of a collar showing a front view thereof in closed position. Fig. 2 is a perspective view showing the ends of the collar in open position.

Referring to the drawings, 4 designates the outer flap of the collar body proper which has an internal flap 5 connected thereto at the upper or folded edge 6 by any suitable means such as a line of stitches (not shown). The inner flap is provided with fastening tongues 7 and 8 which extend beyond the ends of the collar proper at the lower edge thereof. It will be seen on reference to Fig. 2 that these tongues extend from the bottom edge upwardly to approximately half the height of the collar leaving the whole upper portion of the collar at the front free to spring outwardly with any movement of the neck of the wearer. The inner and outer folds 4 and 5 are secured together at the ends of the collar from the upper edge downwardly by lines of stitching 9. This stitching extends approximately half way down from the top of the collar and is then turned laterally outward at right angles a short distance, as designated by the numeral 10. The stitching 10 thus forms an abutment adapted to hold the upper edges of the fastening tongues in position to prevent the collar from gaping. It will be noted that one of the tongues is provided with the usual curved upper edge 11, which is adapted to lie closely against the line of stitching 10 to insure the ends of the collar at the top being held closely together. The laterally extending lines of stitching 10 will not only serve to hold the tongues 7 and 8 in position, but will prevent the tie from sliding too far toward the top of the collar. The upper end corners of the collar being free from the fastening tongues will have all the spring movement of the ordinary standing collar, while the edges of the fold collar will still be maintained. The upper corners of the collar may of course be made vertical or may be turned downwardly to form a wing collar, as shown in dotted lines in Fig. 2. Although I prefer to use fastening tongues of approximately half the height of the collar, it will be obvious that the height of these tongues and consequently the position of the lines of stitching 10 may be varied without sacrificing the utility of this feature of the invention.

Having now fully described my invention, what I claim is:—

A collar with inner and outer folded flaps, the inner flap having outwardly projecting tongues the top edges of which are arranged in approximate line with the central portion of the outer flap, one of said tongues being curved upwardly and terminating in a pointed end and having a key hole slot fastening which is arranged approximately near the lower edge thereof, the other tongue being curved downwardly and also terminating in a pointed end and having an ordinary fastening, the upper corners of the two flaps being stitched together by a plurality of rows of stitches arranged in rectangular form to provide abutments which are adapted to contact with a necktie to prevent upward movement of the same, and said abutments also permitting of holding the tongues in proper position.

In witness whereof I have hereunto set my hand in the presence of two witnesses.

RICHARD MONTGOMERY RODDEN.

Witnesses:
　STUART R. W. ALLEN,
　G. M. MORELAND.

Copies of this patent may be obtained for five cents each, by addressing the "Commissioner of Patents, Washington, D. C."